United States Patent
Sand

[11] Patent Number: 5,286,433
[45] Date of Patent: Feb. 15, 1994

[54] METHOD AND DEVICE FOR PRESSURE BALANCING OF HOSES AT EXTRUDING OF TWO COMPONENTS

[75] Inventor: Kjell Sand, Västra Frölunda, Sweden

[73] Assignee: Applicator System AB, Mölnlycke, Sweden

[21] Appl. No.: 842,124

[22] PCT Filed: Sep. 20, 1990

[86] PCT No.: PCT/SE90/00602
§ 371 Date: Mar. 24, 1992
§ 102(e) Date: Mar. 24, 1992

[87] PCT Pub. No.: WO91/04103
PCT Pub. Date: Apr. 4, 1991

[30] Foreign Application Priority Data

Sep. 25, 1989 [SE] Sweden ............... 8903143-9

[51] Int. Cl.⁵ ............... B29C 47/12; B05B 12/00; B05B 15/00
[52] U.S. Cl. ............... 264/176.1; 137/98; 251/5; 264/40.7; 264/240; 264/328.6; 264/349; 425/145; 425/376.1
[58] Field of Search ............... 264/176.1, 240, 349, 264/40.7, 328.6, 328.17; 425/145, 376.1; 137/98; 141/104, 37; 251/5

[56] References Cited

U.S. PATENT DOCUMENTS

| | | | |
|---|---|---|---|
| 676,366 | 6/1901 | Koch et al. | 141/37 |
| 2,584,226 | 2/1952 | Pool | 425/145 |
| 2,598,307 | 5/1952 | Rutgers | 251/5 |
| 3,154,618 | 10/1964 | Baer et al. | 264/349 |
| 3,701,618 | 10/1972 | Wall et al. | 425/376.1 |
| 3,761,213 | 9/1973 | Wight | 425/466 |
| 4,309,373 | 1/1982 | Althausen et al. | 264/240 |
| 4,368,219 | 1/1983 | Nagata et al. | 427/236 |
| 4,848,387 | 7/1989 | Hon | 141/104 |
| 5,125,819 | 6/1992 | Hager et al. | 425/145 |

FOREIGN PATENT DOCUMENTS

WO91/04103 4/1991 PCT Int'l Appl. ............. 264/328.17
839698 6/1981 U.S.S.R. .

Primary Examiner—Jeffery Thurlow
Assistant Examiner—Mathieu Vargot
Attorney, Agent, or Firm—Ostrolenk, Faber, Gerb & Soffen

[57] ABSTRACT

A method and apparatus for supplying two different components at two different flow rates to an extrusion head. A first component is delivered to an extrusion head through a first hose at a predetermined pressure. A second component is delivered to the extrusion head through a second hose at substantially the same predetermined pressure as the first component. The second hose extends partially through the first hose so that both components are delivered to the extrusion head at constant equal pressures.

3 Claims, 2 Drawing Sheets

METHOD AND DEVICE FOR PRESSURE BALANCING OF HOSES AT EXTRUDING OF TWO COMPONENTS

The present invention refers to a method and a device to pressure balance hoses at supply of two different components with substantially the same pressure to an extrusion head, where the flow of the second component is substantially below the flow of the first component, e.g. at thermosetting plastic extrusion.

BACKGROUND OF THE INVENTION

The dosing and forward feeding of the components is commonly carried out by means of piston pumps, which causes the hoses to enter into a self oscillating state at the forward and reverse action of the pump piston. A remaining pulsation is obtained which leads to an exact dosing being impossible, particularly if the dosing quantity is very small, which is the case e.g. at thermosetting plastic extrusion, where the setting agent only constitutes about 1–4 volume-%. Even at shut-off the extrusion head the hose is somewhat extended, which contributes to incorrect dosing.

SUMMARY OF THE INVENTION

The object of the invention is to avoid the above stated problem and provide a method stated by way of introduction, which means that pressure changes in the supply hoses does not influence the flow ratio between the components. This has been solved by letting at least during a part of the path to the extrusion head the pressure from the first component act on the second component and by supplying the second component in a second hose which during at least one part of the path to the extrusion head extends inside a first hose in which the first component is supplied.

BRIEF DESCRIPTION OF THE DRAWINGS

The invention will be described more in detail with reference to an embodiment shown in the accompanying drawing.

DETAILED DESCRIPTION OF THE PREFERRED EMBODIMENT

Figure 1:
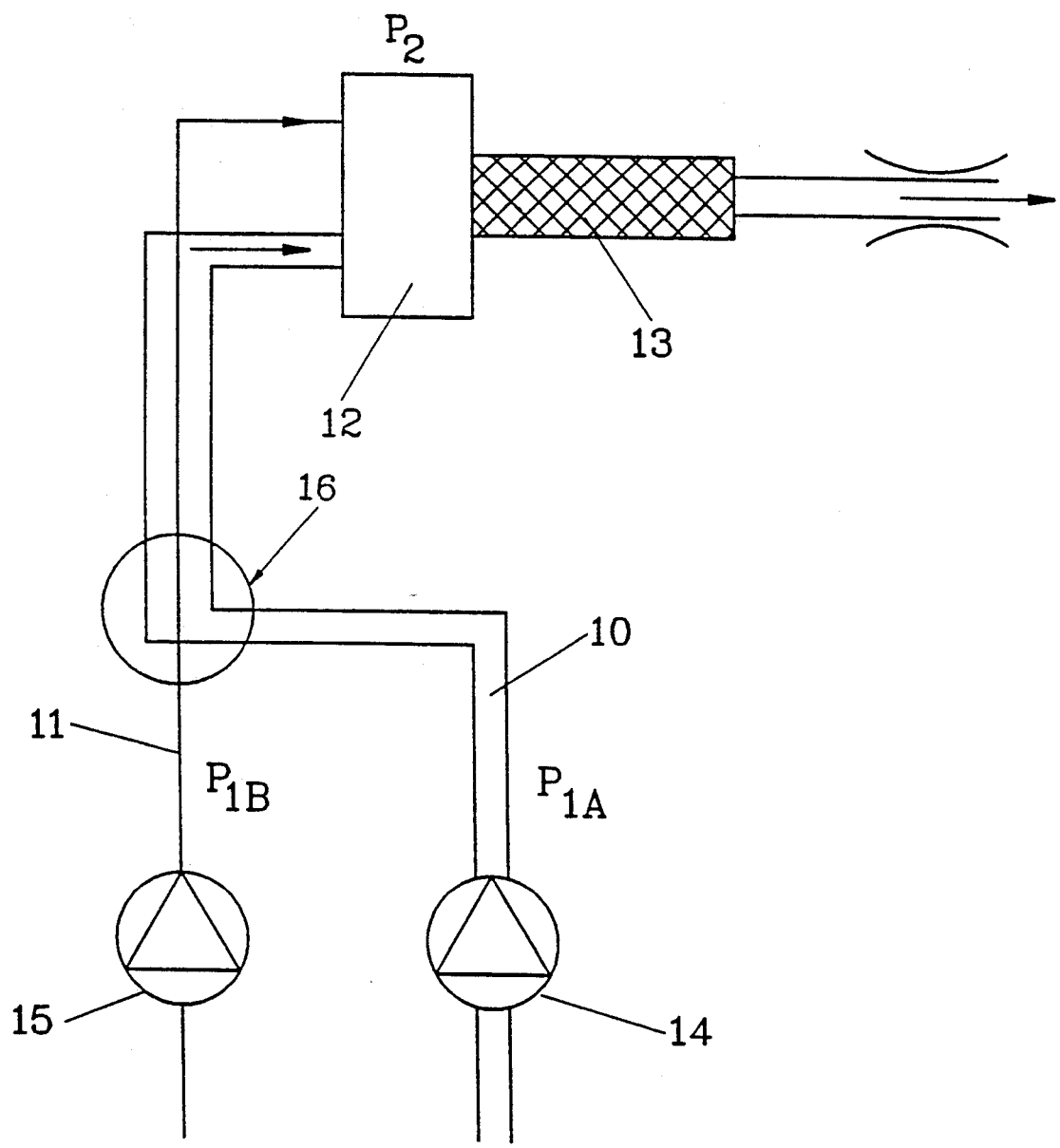
FIG. 1 is a diagrammatic explanatory outline of a device according to the invention.
Figure 2:
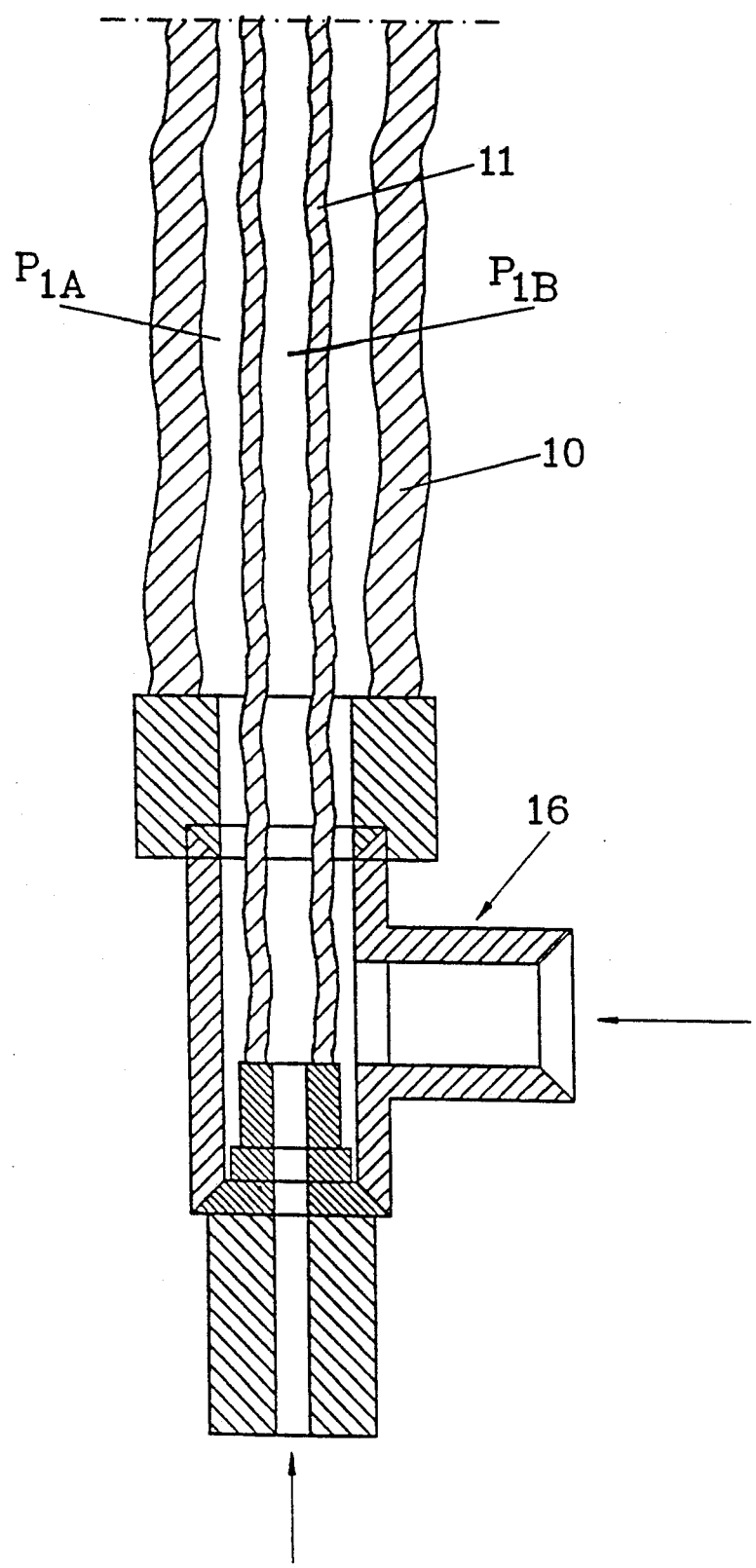
FIG. 2 is a section through a part of the pressure balanced hose corresponding to encircled part in FIG. 1.

In the drawing the reference numbers 10 and 11 designate two hoses for supply of a first and a second component, e.g. plastic and setting agent, to a mixing chamber 12 to an extrusion head. The components fed forward with substantially the same pressure $P_{1A} \approx P_{1B}$ by means of pumps 14 and 15 e.g. piston pumps. The flow of the second component substantially decreases the flow of the first component.

The second hose 11 is via a branch pipe 16 conducted into the first hose 10 and then extends inside the first hose 10 over a substantial part of its length before the components are mixed in the mixing chamber 12. The pressure $P_2$ in this is essentially the same as in the hoses 10 and 11.

Since $P_{1A} \approx P_{2B}$, that is the same pressure on the out and inside of the second hose 11, this will not extend at pressure variations in the forward feeding. The flow fed forward of the second component will be substantially constant in time.

Pressure changes, e.g. in connection with the piston movements or at shut-off of the extrusion head, thus will not influence the flow ratio between the first and the second component.

The invention is of course not limited to thermosetting plastic extrusion but can be applied in other connections where two components are extruded, whereby the flow of one of the components is less than the flow of the second component.

I claim:

1. A method to pressure balance hoses during supply of two different components with substantially the same pressure to an extrusion head, where the flow of the second component is substantially below the flow of the first component, comprising the steps of:
   supplying the first component to the extrusion head in a first hose;
   supplying the second component to the extrusion head in a second hose; and
   extending said second hose inside said first hose in which the pressure of the first component acts for at least a part of the path to the extrusion head.

2. A device for pressure balancing hoses during supply of two different components with substantially the same pressure to an extrusion head, where the flow of the second component is substantially below the flow of the first component comprising:
   first hose means for supplying a first component to the extrusion head; and
   second hose means partially enclosed in said first hose means for supplying a second component to the extrusion head and arranged for pressure actuation of the second component.

3. The device according to claim 2, including a branch pipe for connecting said second hose means to extend partially through said first hose means.

* * * * *